United States Patent [19]
Audet

[11] Patent Number: 5,938,396
[45] Date of Patent: Aug. 17, 1999

[54] TOOL BOX CARRIER

[76] Inventor: Bernard Audet, 386 rue Tremblay, Chibougamau, Canada, G8P 2R6

[21] Appl. No.: 08/883,597

[22] Filed: Jun. 26, 1997

[51] Int. Cl.$^6$ ...................................................... B62B 1/06
[52] U.S. Cl. ..................... 414/490; 280/47.28; 280/47.29
[58] Field of Search ..................................... 414/444, 490; 280/5.24, 35, 43.1, 47.19, 47.28, 47.29, 659

[56]  References Cited

U.S. PATENT DOCUMENTS

| | | | |
|---|---|---|---|
| 2,743,833 | 5/1956 | Peterson | 280/5.24 X |
| 3,578,353 | 5/1971 | Lockhart | 414/444 X |
| 4,249,749 | 2/1981 | Collier | 280/79.11 X |
| 4,420,166 | 12/1983 | Law et al. | 280/5.24 |
| 4,491,201 | 1/1985 | Mountz | 188/42 |
| 4,632,410 | 12/1986 | Bainbridge et al. | 280/32.5 |
| 4,726,602 | 2/1988 | Sanders et al. | 280/47.29 X |
| 4,737,065 | 4/1988 | Ju | 414/490 |
| 5,080,381 | 1/1992 | Perez | 280/35 |
| 5,117,979 | 6/1992 | Brightbill | 206/372 |
| 5,160,026 | 11/1992 | Marsh | 206/373 |
| 5,251,922 | 10/1993 | Mann | 414/490 X |
| 5,595,395 | 1/1997 | Wilson | 280/47.19 X |
| 5,615,902 | 4/1997 | Reurich | 280/47.19 X |
| 5,845,915 | 12/1998 | Wilson | 280/47.19 |

FOREIGN PATENT DOCUMENTS

| | | | |
|---|---|---|---|
| 2333457 | 1/1974 | Germany | 280/659 |
| 2142589 | 1/1985 | United Kingdom | 280/43.1 |
| 2269806 | 2/1994 | United Kingdom | 414/490 |

*Primary Examiner*—James W. Keenan
*Attorney, Agent, or Firm*—Goudreau Gage Dubuc & Martineau Walker

[57]  ABSTRACT

A tool box carrier to carry a tool box on level surfaces and allowing the tool box to be carried in stairs is described herein. The tool box carrier includes a wheeled base provided with a longitudinal frame and a tool box support assembly so mounted to the frame as to be longitudinally movable thereon. A hand operated winch is mounted between the frame and the tool box support assembly to assist the longitudinal movements of the tool box support assembly. The tool box is mounted in a pivotable portion of the tool box support assembly to maintain the tool box in a horizontal position when the tool box carrier is tilted during transport.

10 Claims, 4 Drawing Sheets

5,938,396

TOOL BOX CARRIER

FIELD OF THE INVENTION

The present invention generally relates to carriers. More specifically, the present invention relates to a carrier that is designed to carry a tool box.

BACKGROUND OF THE INVENTION

Tool box carriers are well known in the art. They usually consist of a larger tool chest provided with four pivotable casters allowing the tool box and the tool chest to be carried onto level surfaces.

These conventional tool carriers suffer from major drawbacks: it is not easily possible to climb or to descend stairs with these carriers and it is not easily possible to raise or to lower the tool box with respect to the tool carrier to bring the tool box to a position where the contents of the tool box may be browsed by the user.

U.S. Pat. No. 4,249,749, issued on Feb. 10, 1981 to Leroy Collier and entitled "Mobile Lift Cart" discloses a tool box carrier free of the above drawbacks of the conventional tool chests used as tool box carriers. The tool box carrier of Collier includes a wheeled base so configured as to allow stairs to be climbed and descended. Furthermore, Collier's tool box carrier includes a tool box support mounted to the wheeled base via a scissor type mechanism allowing the tool box support to be raised or lowered with respect to the wheeled base.

While the tool box carrier disclosed by Collier is a major improvement over the conventional tool chests used as tool box carriers, it has nevertheless major drawbacks. Firstly, when the tool box support is to be raised from the wheeled base, the user must manually pull the support upwardly, which can be difficult and even dangerous when the tool box contains heavy tools. Secondly, the tool box has to be fixedly mounted to the tool box carrier since the tool box is tilted when stairs are ascended or descended. Thirdly, the tools present in the tool box during stairs ascension or descent are likely to be damaged because of the tilt imposed on the tool box.

OBJECTS OF THE INVENTION

An object of the present invention is therefore to provide an improved tool box carrier free of the above noted drawbacks.

SUMMARY OF THE INVENTION

More specifically, in accordance with the present invention, there is provided a tool box carrier for carrying a tool box, said carrier comprising:

a wheeled base including a longitudinal frame;

a tool box support assembly so mounted to the longitudinal frame as to be longitudinally movable thereon; the support assembly being configured and sized to receive the tool box;

means for assisting the longitudinal displacement of the support assembly on the frame.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Turning now to the appended figures, a tool box carrier 10 according to an embodiment of the present invention will be described. The tool box carrier 10 is configured to carry a tool box 11 and includes a wheeled base 12 and a tool box support assembly 14.

Figure 1:
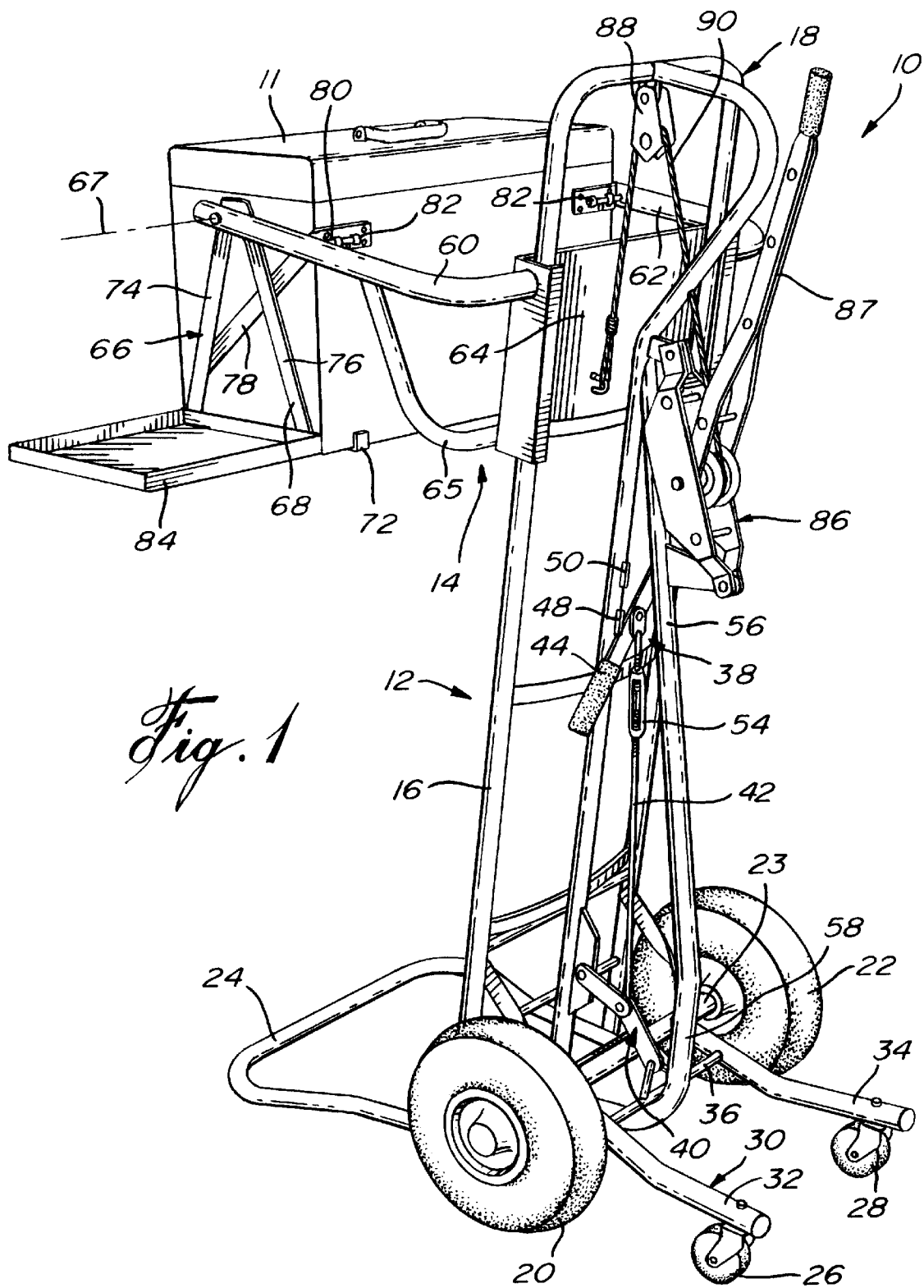
FIG. 1 is a perspective view illustrating a tool box carrier according to an embodiment of the present invention, the tool box carrier being illustrated in a substantially vertical position.

The wheeled base 12 is similar to a conventional hand truck, including a longitudinal frame 16 provided with a handle portion 18 at an upper end thereof and a pair of parallel wheels 20, 22, linked by a shaft 23, at a lower end thereof. The longitudinal frame 16 also includes a U-shaped rest 24 to maintain the frame 16 in an upright position as shown in FIG. 1.

It is to be noted, however, that the wheeled base 12 differs from a conventional hand truck with respect to many features. Indeed, it includes a pair of casters 26, 28 mounted to a caster support assembly 30 reciprocately movable between an extended position, an intermediate position and a retracted position as will be described hereinbelow. The casters 26, 28 are provided to increase the stability of the tool box carrier 10 when it is in a substantially vertical position and to allow the tool box carrier 10 to be carried onto four wheels while it is in a tilted position as will be described hereinafter.

The caster support assembly 30 includes a pair of parallel arms 32, 34 to which the casters 26, 28 are respectively mounted. The arms 32, 34 are pivotally mounted to the shaft 23 and are interconnected by a tube 36 to maintain their parallel relationship. The caster support assembly 30 also includes an extension mechanism 38 allowing the casters 26, 28 to be reciprocately movable between an extended position (illustrated in FIGS. 1, 3 and 4), an intermediate position (illustrated in dashed lines 41 in FIG. 3) and a retracted position (illustrated in FIG. 2 and in dashed lines in FIG. 3).

The extension mechanism 38 includes an articulated element 40 mounted between the tube 36 and the frame 16. The articulated element 40 is connected to a first end of a length adjustable pull/push rod 42. A handle 44 is provided at a second end of the rod 42. The handle 44 is pivotally mounted to the frame 16 via a pivot pin 46 (see FIGS. 2 and 4).

Figure 3:
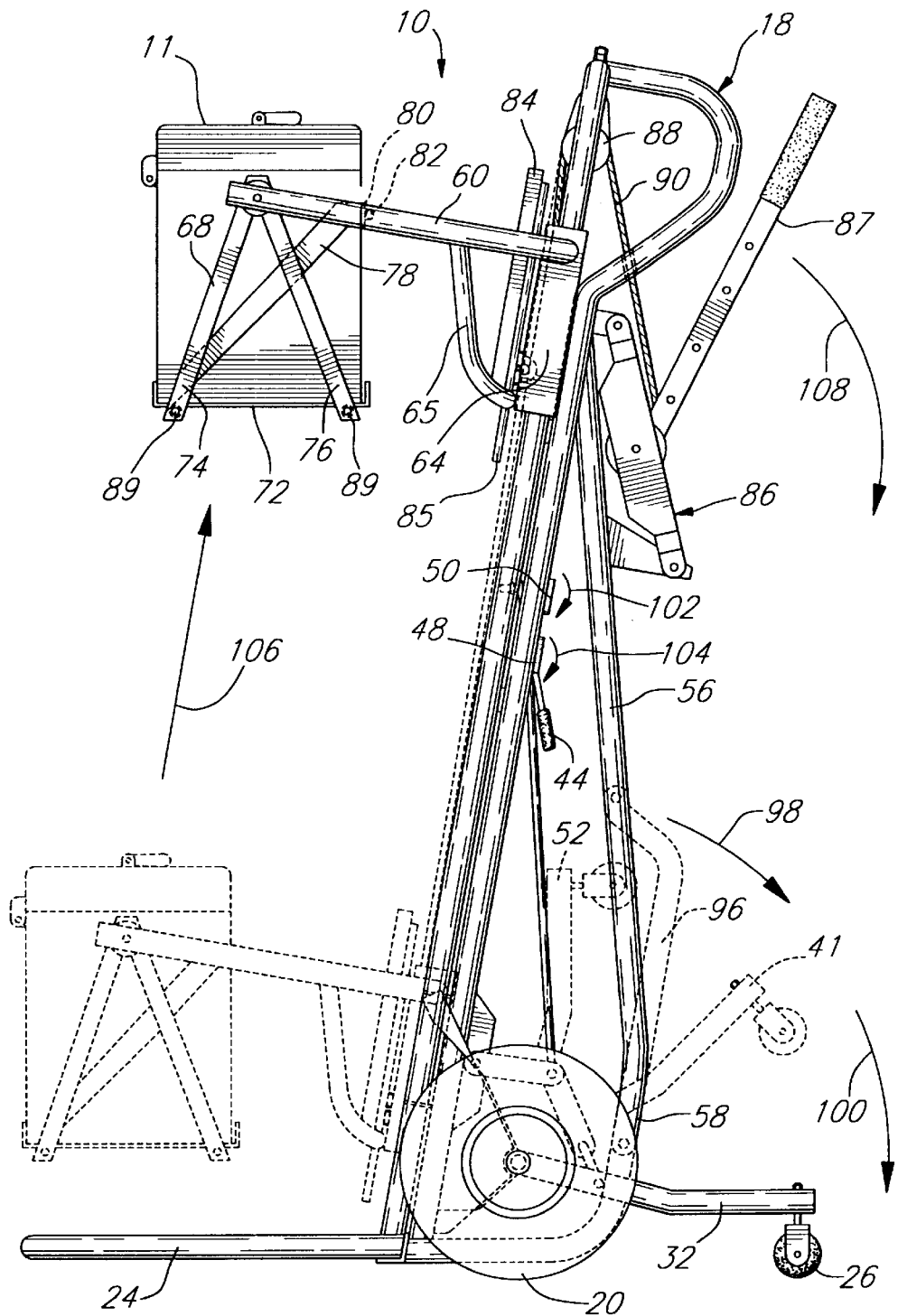
FIG. 3 is a side elevational view of the tool box carrier of FIG. 1.
Figure 4:
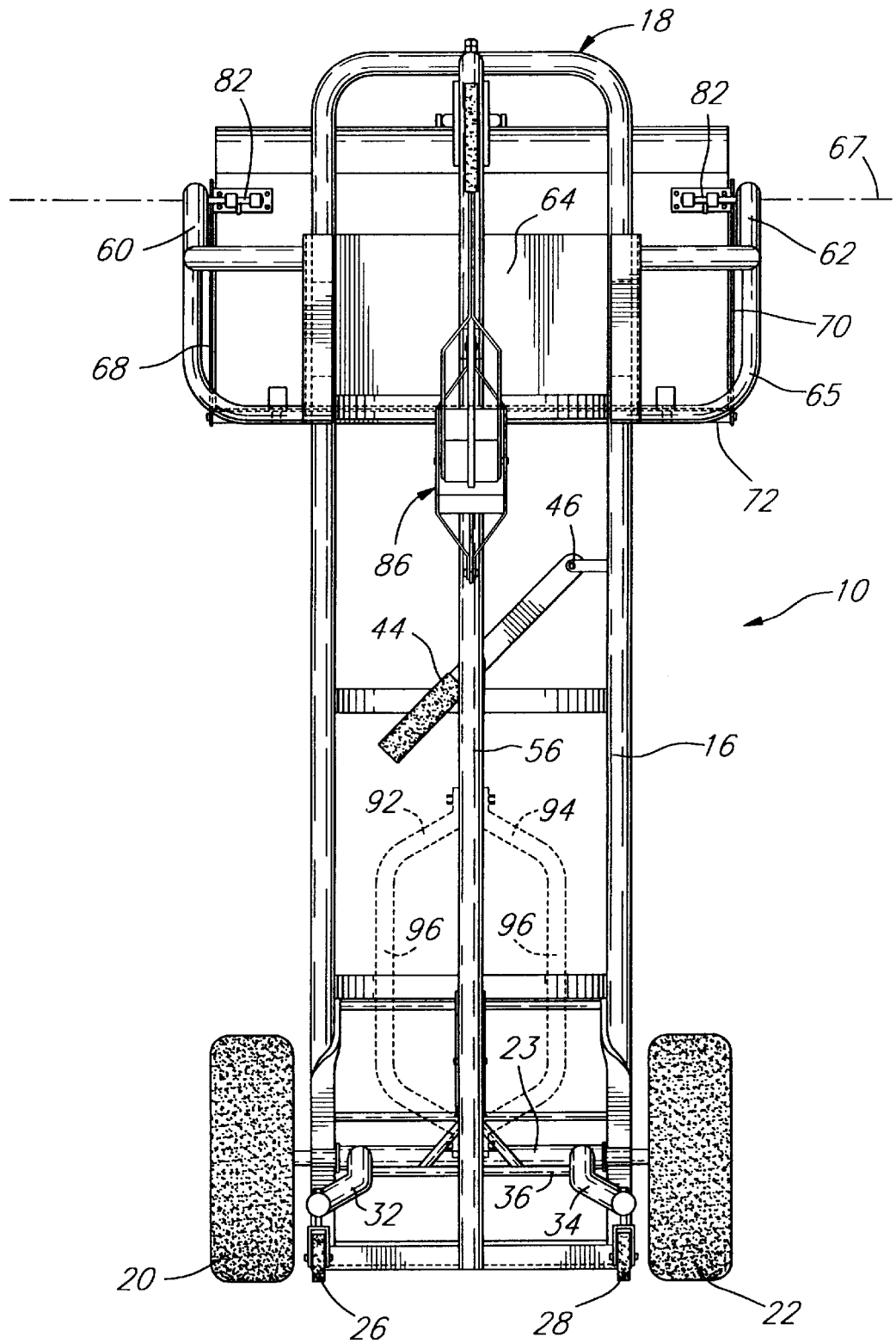
FIG. 4 is a rear elevational view of the tool box carrier of FIG. 1.

As can be better seen from FIGS. 1 and 3, the extension mechanism 38 also includes a pair of stoppers 48, 50 mounted to the frame 16. As will be easily understood by one skilled in the art, when the handle 44 is positioned below stopper 48, the casters 26, 28 are in an extended position; when the handle 44 is positioned between stoppers 48 and 50 the casters 26, 28 are in an intermediate position (see dashed lines 41 in FIG. 3); and when the handle 44 is positioned above stopper 50 the casters 26,28 are in a retracted position (see dashed lines 52 in FIG. 3). The rod 42 is provided with a turnbuckle 54 allowing the extended, intermediate and retracted positions to be adjusted.

Another difference between the wheeled base 12 and a conventional hand truck is the tube 56 interconnecting the handle portion 18 and the lower portion of the frame 16. The tube 56 has a straight portion 58 configured to contact stair steps as will be described hereinafter.

The tool box support assembly 14 includes a pair of support arms 60, 62 mounted to the frame 16 through a sliding plate 64. A generally U-shaped stabilizer tube 65 interconnects the two support arms 60, 62 and the plate 64. The sliding plate 64 is essentially U-shaped and is configured to longitudinally slide onto the frame 16. Note that the support arms 60, 62 and the stabilizer tube 65 advantageously do not present sharp edges that could injure the user.

Of course, friction reducing material (not shown) could be provided between the plate 64 and the frame 16 to reduce the friction therebetween and to reduce the wear of these components.

A tool box support 66 is so mounted between the support arms 60 and 62 as to be pivotable about an axis 67. The tool box support 66 includes two substantially A-shaped side portions 68, 70 and a bottom portion 72 connected to the side portions 68 and 70.

Each side portion 68 and 70 includes first and second elements 74 and 76 forming an inverted V shape having its point pivotally mounted to the support arms 60, 62, respectively. The lower portions of the elements 74 and 76 are connected to the bottom portion 72. Each side portion 68 and 70 also includes a third element 78 interconnecting the first and second elements 74 and 76. The third element 78 is provided with a bend allowing a contact between a portion 80 of the third element 78 and the back of the tool box 11. A latch mechanism 82 is provided on the portion 80 of each side portion 68 and 70. When the latches 82 are engaged with the support arms 60 and 62, respectively, the tool box support 66 can not rotate about axis 67.

As can be better seen from FIG. 1, the tool box support 66 may be provided with shelves 84 that are removably attached to the bottom portion 72. The shelves 84 include a pair of projecting pins 85 (see FIGS. 2 and 3) configured to be inserted in mounting apertures 89 of the tool box support 66. When they are not in use, the shelves 84 may be stored against the plate 64 (see FIGS. 2 and 3) by inserting the projecting pins 85 in apertures 89 of the stabilizer tube 65.

The tool box carrier 10 also includes a mechanism to assist the longitudinal movements of the tool box support assembly 14 onto the frame 16. This mechanism includes a hand operated winch 86 provided with a handle 87 and mounted to the frame 16, a pulley 88 mounted to the handle portion 18 and a cable 90 connected to the plate 64, passing through the pulley 88 and engaged to the hand operated winch 86. Therefore, by operating the hand operated winch 86, it is possible to raise and to lower the tool box assembly 14 without much efforts.

Optionally a pair of tubes 92, 94 including straight portions 96 configured to contact stair steps as will be described hereinafter may be attached to the tube 56. The installation of these tubes 92 and 94 increase the surface of contact between the tool box carrier 10 and the stairs which may be advantageous if the steps are made of wood. The tubes 92 and 94 may therefore advantageously be installed if the tool box carrier 10 for residential use.

It is to be noted that to increase the stability of the tool box carrier 10 when used to ascend or to descend stairs, the straight portion 58 of the tube 56 may be provided with a longitudinal plate (not shown) so as to increase the surface of contact between the tube 56 and the edge of the stair steps.

In operation, the tool box 11 is installed in the tool box support 66 as illustrated in the appended figures.

Figure 2:
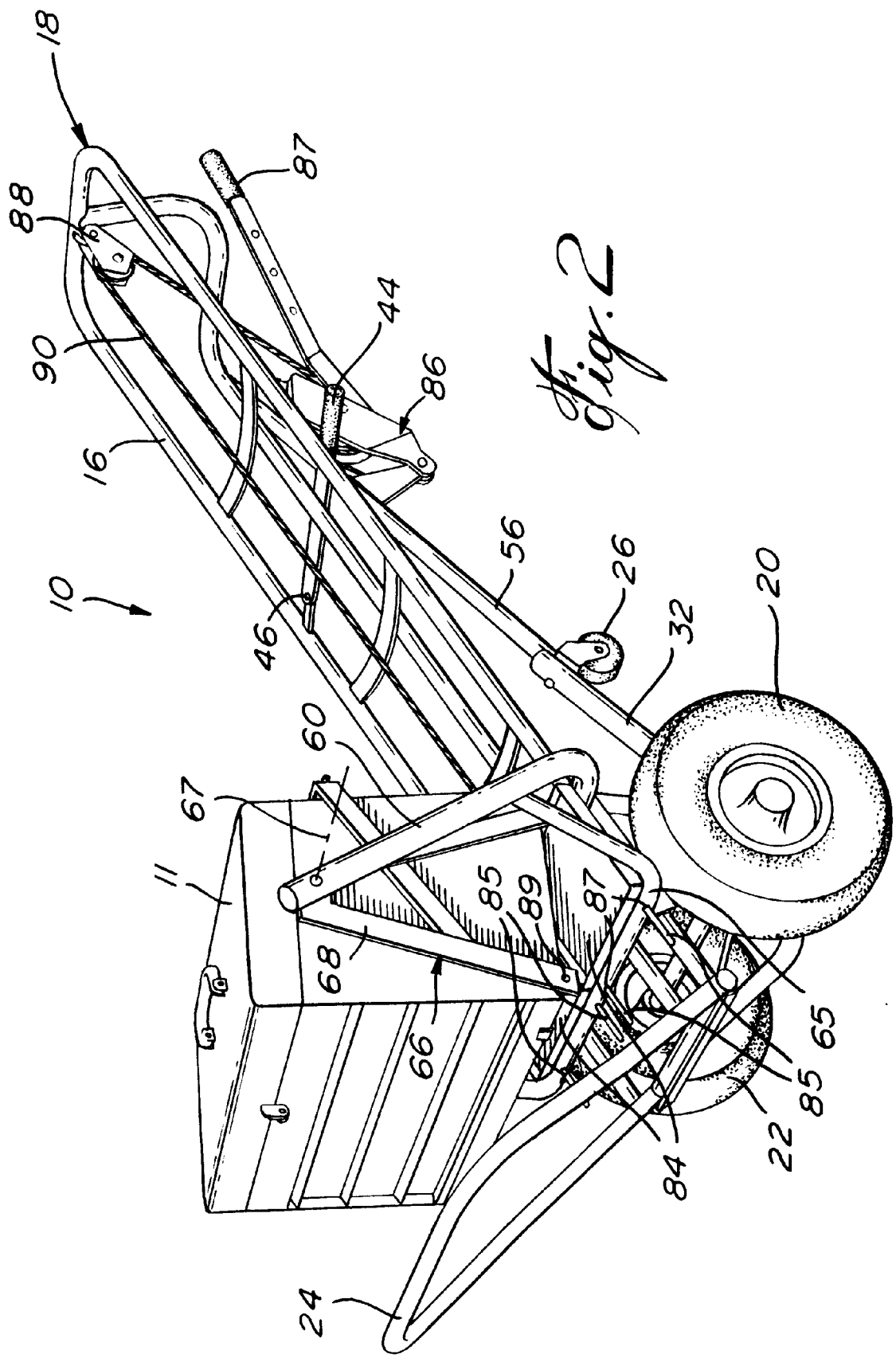
FIG. 2 is a perspective view of the tool box carrier of FIG. 1, the tool box carrier being in a tool box carrying position.

When the user wants to carry the tool box 11 from one location to another, the tool box is lowered to the carrying position illustrated in FIG. 2, the user then holds the handle portion 18 and tilts the frame 16. The tool box carrier 10 may thus be moved on level floors and, since the wheeled base 12 is similar to a conventional hand truck, it is possible to ascend and to descend stairs.

It is to be noted that the flat portion 58 of the tube 56, and optionally the flat surfaces 96 of the tubes 92 and 94, will contact the edge of the stair step directly above the stair step onto which the wheels 20, 22 rest and will slide thereon. This will ease stair ascension and descend since the wheels 20 and 22 will only contact the edges of the stair steps.

When the tool box carrier 10 is in the carrying position illustrated in FIG. 2, the tool box support 66 pivots about axis 67 to maintain the tool box 11 is a generally horizontal position.

Turning now to FIG. 3, when the user reaches the desired destination, the caster wheels 26, 28 are lowered (see arrows 98, 100) via a downward movement of the handle 44 (see arrows 102, 104). When the casters 26, 28 are in the position illustrated in full lines in FIG. 3, the user may safely raise the tool box support assembly 14 (see arrow 106) from its carrying position illustrated in dashed lines to its working position illustrated in full lines by pivotal movements of the handle 87 (see arrow 108).

The latches 82 may then be engaged with the arms 60 and 62 to prevent further pivotal movements of the tool box support 66 which could be detrimental to the user's work.

Finally, the shelves 84 may be installed on both sides of the tool box support 66 to increase the horizontal surface available to the user.

FIG. 2 illustrates the tool box carrier 10 is a carrying position where only the two wheels 20, 22 are used to support the carrier 10. Of course, the user (not shown) must support the handle portion 18 to prevent the carrier to fall.

It is to be noted that a second carrying position (not shown) is possible. Indeed, the wheels 20, 22 and the casters 26, 28 may contact the ground while the carrier 10 is tilted if the caster support assembly 30 is in the intermediate position as shown by dashed lines 41 in FIG. 3. If this is the case, is it not required to support the tool box carrier 10 since it will maintain its tilted position. However, it should be noted that when the carrier 10 is placed in this second carrying position, the tool box support assembly 14 should advantageously be so positioned as to be above the wheels 20, 22 to improve the stability of the carrier 10.

As will be apparent to one skilled in the art, the length of the frame 16 could be increased to accomodate the use of the carrier 10 for mechanics working on trucks. Indeed, since the motor compartment of these trucks is higher above the ground, a longer frame 16 will enable the user to raise the tool box 11 to an adequate working level.

It is to be noted that the U-shaped rest 24 could be replaced by another type of stabilizer. For example, a second pair of casters (not shown) could be mounted in the place of the U-shaped rest 24. If this is the case, a brake assembly (not shown) could advantageously be provided to releasably prevent the unwanted movements of the carrier 10 when it is in the position illustrated in FIG. 1.

Although the present invention has been described hereinabove by way of preferred embodiments thereof, it can be modified, without departing from the spirit and nature of the subject invention as defined in the appended claims.

What is claimed is:

1. A tool box carrier for carrying a tool box, said carrier comprising:

a wheeled base including a longitudinal frame;

a tool box support assembly so mounted to said longitudinal frame as to be longitudinally movable thereon; said support assembly including a generally U-shaped slidable portion slidably mounted to said longitudinal frame, first and second cantilever arms so mounted to said generally U-shaped slidable portion as to extend outwardly therefrom, said first and second cantilever arms being generally parallel and provided with respective distal ends with a generally horizontal axis extending therebetween, and a tool box support portion so mounted to said distal ends of said first and second cantilever arms as to pivot about said generally horizontal axis; said tool box support portion being configured and sized to receive the tool box; and a longitudinal displacement assisting mechanism provided between the wheeled base and the tool box support assembly to assist a longitudinal displacement of said tool box support assembly on said frame.

2. A tool box carrier as recited in claim 1, wherein said longitudinal frame has a distal end provided with a pair of wheels and a proximate end provided with a handle assembly.

3. A tool box carrier as recited in claim 2, wherein said wheeled base includes means for maintaining said longitudinal frame in an essentially vertical position.

4. A tool box carrier as recited in claim 3, wherein said maintaining means include a substantially U-shaped rest mounted to said distal end of said frame.

5. A tool box carrier as recited in claim 3, wherein said maintaining means include a pair of casters mounted to a caster support reciprocately pivotable between a retracted position and an extended position where the casters are in contact with the ground when said longitudinal frame is in an essentially vertical position and said wheels are in contact with the ground.

6. A tool box carrier as recited in claim 5, wherein said caster support includes a locking mechanism so configured as to releasably lock said caster support in said extended position.

7. A tool box carrier as recited in claim 2, wherein said longitudinal frame includes a substantially L-shaped stair step contacting element configured so as to contact an edge of a stair tread when the tool box carrier is used to climb or to descend stairs.

8. A tool box carrier as recited in claim 1, wherein said tool box support portion also includes means for selectively preventing pivotal movement thereof.

9. A tool box carrier as recited in claim 1, wherein said support assembly further includes a pair of removable lateral shelves configured to be mounted to said tool box support portion.

10. A tool box carrier as recited in claim 1, wherein said longitudinal displacement assisting mechanism includes a hand operated winch mounted to said wheeled base and including cable means connected to said tool box support assembly.

* * * * *